(12) United States Patent
Siegel et al.

(10) Patent No.: US 8,572,718 B2
(45) Date of Patent: Oct. 29, 2013

(54) METHOD, DEVICE, AND COMPUTER PROGRAM PRODUCT FOR DIFFERENTIATED TREATMENT OF EMAILS BASED ON NETWORK CLASSIFICATION

(75) Inventors: Steven A. Siegel, Mendham, NJ (US); Karen Mullis, Loganville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 509 days.

(21) Appl. No.: 12/646,181

(22) Filed: Dec. 23, 2009

(65) Prior Publication Data

US 2011/0154474 A1   Jun. 23, 2011

(51) Int. Cl.
*H04L 29/06* (2006.01)

(52) U.S. Cl.
USPC .................. 726/12; 726/1; 726/22; 713/153; 713/154

(58) Field of Classification Search
USPC .......................... 726/1, 12, 22; 713/153, 154
See application file for complete search history.

(56) References Cited

U.S. PATENT DOCUMENTS

| | | |
|---|---|---|
| 7,085,745 B2 | 8/2006 | Klug |
| 7,328,244 B1 | 2/2008 | Kelley |
| 7,493,359 B2 | 2/2009 | Fitzpatrick et al. |
| 2002/0059454 A1* | 5/2002 | Barrett et al. ................. 709/245 |
| 2003/0104827 A1* | 6/2003 | Moran et al. .................. 455/466 |
| 2004/0177048 A1* | 9/2004 | Klug ............................ 705/401 |
| 2005/0081059 A1* | 4/2005 | Bandini et al. ............... 713/201 |
| 2005/0144239 A1* | 6/2005 | Mattathil ...................... 709/206 |
| 2007/0005702 A1 | 1/2007 | Tokuda et al. |
| 2007/0156732 A1 | 7/2007 | Surendran et al. |
| 2009/0089798 A1 | 4/2009 | Anderson et al. |
| 2009/0164588 A1 | 6/2009 | D'Amato et al. |
| 2011/0119730 A1* | 5/2011 | Eldar et al. ....................... 726/1 |

* cited by examiner

*Primary Examiner* — Brandon Hoffman
*Assistant Examiner* — Thomas C Lauzon
(74) *Attorney, Agent, or Firm* — Cantor Colburn LLP

(57) ABSTRACT

Method, device, and computer program product are provided for differentiated treatment of incoming and outgoing emails based on a network server. A server receives a query from a gateway, and the query includes information about an email received by the gateway. The server obtains rules for processing the email of the query. The server determines an identity for the email based on the rules for processing the email. The server transmits the identity to the gateway to cause the gateway to send the email having the identity to a post office server. The email having the identity is configured to cause the post office server to process the email based on the identity.

19 Claims, 4 Drawing Sheets

METHOD, DEVICE, AND COMPUTER PROGRAM PRODUCT FOR DIFFERENTIATED TREATMENT OF EMAILS BASED ON NETWORK CLASSIFICATION

BACKGROUND

Exemplary embodiments relate to differentiated treatment of communications, and more particularly to, an external system for providing a centralized system of differentiated treatment of emails.

In today's society, people may have more than one cell phone, email account, instant messaging account, social networking account, etc., and it may be troublesome to keep up with how contacts are classified on each account. Also, when a change occurs to a contact on an account, a person may not take the time to update each communication means accordingly or the person may forget that an update is needed.

BRIEF SUMMARY

Exemplary embodiments include a method for differentiated treatment of incoming and outgoing emails based on a network server. A server receives a query from a gateway, and the query includes information about an email received by the gateway. The server obtains rules for processing the email of the query. The server determines an identity for the email based on the rules for processing the email. The server transmits the identity to the gateway to cause the gateway to send the email having the identity to a post office server. The email having the identity is configured to cause the post office server to process the email based on the identity.

Other systems, methods, apparatus, devices, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains exemplary embodiments, together with features, by way of example with reference to the drawings.

DETAILED DESCRIPTION OF EXEMPLARY EMBODIMENTS

The concept of personas is tightly tied to the multiple roles that each person plays. Most people may be fellow workers to some people, friends to others, family members to still others, and mere acquaintances or not known personally to some. Exemplary embodiments provide a personas architecture based on the fact that people communicate differently with each of these groups and provide a network based feature in which the network is configured to communicate these communications differently based on accessing an external helper server.

Conventionally, if an individual wanted to change how multiple applications treated certain communications such as telephony, instant messaging, electronic mail (email), social networking, web pages, etc., many separate changes would have to be coordinated across all the applications and performed individually within each application. However, exemplary embodiments can allow, e.g., routing of an incoming or outgoing email to use the same centralized network data that drives other communication applications. For example, by changing the classification of a contact in the network-based address book of the external helper server, treatment of email from that particular contact would change, without having to modify anything internal to the email application, email client, or the device sending/receiving the email. The same reclassification could be used by other communication services.

Figure 1:
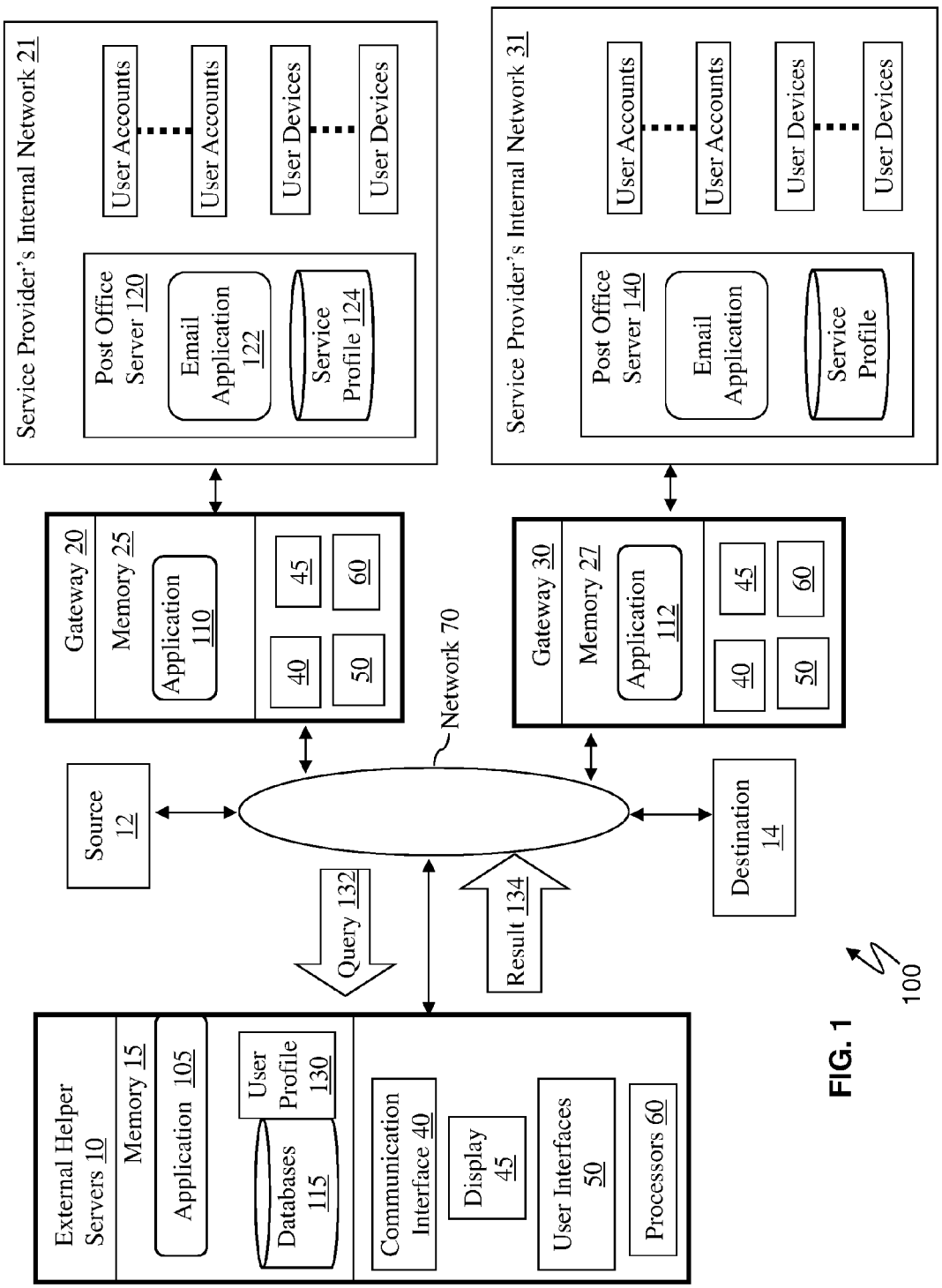
FIG. 1 illustrates a block diagram in accordance with exemplary embodiments.

Now turning to FIG. 1, FIG. 1 illustrates a block diagram 100 in accordance with exemplary embodiments.

The external helper server 10 represents a plurality of servers and computer equipment configured to provide network based classification of communications in accordance with predefined rules as discussed herein. The external helper server 10 may be owned, controlled, and/or operated by a particular service provider (such as, e.g., AT&T®). The external helper server 10 may not be part of the domain and control of outside service providers but the external helper server 10 can be accessed by any outside service provider, such as, COMCAST®, COX®, VERIZON®, HOTMAIL®, GMAIL™, etc. For example, the external helper server 10 may not be part of the internal network of the outside service providers but can be accessed by any of the outside service providers, e.g., by subscriptions of users, by agreements, etc. Also, the external helper server 10 is network addressable which allows the outside service providers to access the external helper server 10 for services. The term "external" is not meant to be limiting but illustrates that the services of external helper server 10 are not limited to the domain of a single service provider who may host, control, and/or operate the external helper server 10 (such as, e.g., FACEBOOK™).

In FIG. 1, a gateway 20 is representative of gateways of numerous service providers of various types of communications. Similarly, gateway 30 is representative of gateways of numerous service providers of various types of communications. In FIG. 1, the gateway 20 is an internetworking system capable of joining together two networks (such as the network 70 and the service providers internal network 21), which may utilize different base protocols. The gateway 20 can be implemented in software, hardware, or as a combination of both, and the gateway 20 sits on the edge of the service provider's internal network 21. The service provider's internal network 21 represents the internal operations and network of the service provider for the gateway 20, which includes user accounts (e.g., HOTMAIL®) for user communication devices (such as a set top box, mobile phone, a computer, etc.), of the service provider.

Likewise, the gateway 30 is an internetworking system capable of joining together two networks (such as the network 70 and the service providers internal network 31), which may utilize different base protocols. The gateway 30 can be implemented in software, hardware, or as a combination of both, and the gateway 30 sits on the edge of the service provider's internal network 31. The service provider's internal network 31 represents the internal operations and network of the service provider for the gateway 31, which includes user accounts for user communication devices of the service provider.

The external helper servers 10, the gateway 20, and the gateway 30 each may include or may be coupled to a communication interface 40 that comprises hardware and software for communicating over the network 70. The external helper servers 10, the gateway 20, and the gateway 30 may include or be coupled to a display 45, user interfaces 50 (such as, e.g., a track ball, mouse, pointing device, keyboard, etc.), and processors 60.

The external helper server 10 includes memory 15 which may be a computer readable storage medium. One or more applications 105 may reside on or be coupled to the memory 15, and the application 105 comprises logic and software components to operate and function in accordance with exemplary embodiments in the form of computer executable instructions. One or more databases 115 include a user profile 130. The user profile 130 includes predefined rules for communications (such as email) related to a user, and the application 105 accesses the user profile 130 to determine a classification identity, which corresponds to differentiated treatment for incoming and outgoing emails in post office servers 120 and 130 as discussed further herein.

The gateway 20 includes memory 25, which may be a computer readable storage medium, and an application 110 may reside on or be coupled to the memory 25. The gateway 30 includes memory 27, which may be a computer readable storage medium, and an application 112 may reside on or be coupled to the memory 27. The gateway 20 and the gateway 30 are configured to operate and function with the normal hardware and software for gateways as understood by one skilled in the art.

For customers who utilize (e.g., subscribe to) the services of the external helper server 10, the external helper server 10 is operative to provide a classification identity that corresponds to differentiated treatment of communications (e.g., incoming and outgoing emails) for the customers. The classification identity (which can be more than one) of each email addressed to the user can be determined in a single location utilizing predefined rules in the user profile 130 of the database 115. Each subscriber to the services of the external helper server 10 has an individual user profile 130 that can be set with preferences as desired by the user.

The service provider's internal network 21 may include numerous post office servers 120, and the service provider's internal network 31 may include numerous post office servers 140. As understood by one skilled in the art, a post office server (also referred to as a mail server) includes one or more applications that receive incoming email from local users (people within the same domain) and remote senders and forwards outgoing email for delivery. The post office server may work in conjunction with other programs to make up what is sometimes referred to as a messaging system. A messaging system includes all the applications necessary to keep email moving as it should. The post office server may utilize SMTP (Simple Mail Transfer Protocol) or ESMTP (extended SMTP) for sending e-mail, POP3 (Post Office Protocol 3) or IMAP (Internet Message Access Protocol) for receiving email, and other protocols as understood by one skilled in the art.

As an example, customers may want differentiated treatment of their emails with different contacts, which may be based on the email address of the contacts. For email, the external helper server 10 is operative to provide an identity that will be utilized by the post office server 120 to provide differentiation in how the email is displayed, how the email is organized, how the email is routed, what other means of communication are utilized to alert the customer of the email, etc. The application 105 of the external helper server 10 is configured to provide a network-based categorization of the incoming and outgoing email that causes the post office server 120 to differentiate treatment of the email while minimizing the impact on the email application 122. Particularly, by placing the processing and the determination of the classification identity of the email in the network, which is the external helper server 10, rather than in the email application 122, similar classification rules may be used and managed centrally across multiple types of communications and multiple types of applications, such as email, Short Messaging Service (SMS), Multimedia Messaging Service (MMS), instant messaging, etc.

For example, by changing a contact from a list of business contacts to a list of friends in a network address book of the user profile 130 of the external helper server 10, the processing of emails including multiple different email accounts of a user from different service providers, instant messaging, and other social networking applications will all be changed from the same network source, which is the external helper server 10. That is, each different communication method associated with the user, such as a first email account (e.g., HOTMAIL®), a second email account (e.g., GMAIL™), a third email account, a first instant messaging account (e.g., AOL®), a second instant messaging account (e.g., GOOGLE™), a third instant messaging account, a first social networking account (e.g., MYSPACE™), a second social network account (e.g., FACEBOOK™), etc., can be updated in a central location which is the external helper server 10.

The following is an example for explanation purposes and is not meant to be limiting. A communication may be transmitted from a generic source 12 to the user. In this scenario, the communication is an email sent from a sender of the source 12 to the address of the user over the network 70, and the source 12 is capable (i.e., including hardware and software) of transmitting the email over the network 70 to the gateway 20. The gateway 20 receives the email communication from the source 12 that is addressed to (i.e., intended for) the user's email address (e.g., the user account) in the service provider's internal network 21. Before (which could be during and/or after in some exemplary embodiments) the email is routed to the user's email account, the application 110 in memory 25 of the gateway 20 processes the email from the sender. In this scenario, the gateway 20 represents an email gateway that includes the normal gateway functions as understood by one skilled in the art. The application 110 of the gateway 20 is configured to transmit a query 132 to the external helper server 10 (because the user is a subscriber to the services of the external helper 10). The external helper server 10 is, e.g., network addressable such that the application 110 can transmit the query 132 to the external helper server 10 over the network 70. The query 132 may include information such as the name of the sender (e.g., the sender's email address), the user's email address as the recipient, other recipients' email addresses who may be addressed on the email, the subject line, the time at which the email was sent, priority (such as a flag indicating high priority), whether a return receipt was requested, and any combination thereof.

The application 105 of the external helper server 10 is operative to receive the query 132 and process the result 134 from the application 110 of the gateway 20. The application 105 identifies the user as the recipient and retrieves the user profile 130 in the database 115 for the user. The application 105 may also receive a unique user identification code in the query 132 from the gateway 20, and the external helper server 10 recognizes as the unique user identification code as identifying the user. The unique user identification code may be an alphanumeric code (e.g., 123ACE45Y) created in advance for the user and stored by both the external helper server 10 in memory 15 and the gateway 20 in the memory 25.

As discussed herein, the user profile 130 contains predefined rules for processing email communications for the user. In the user profile 130, the user has set these predefined rules in advance and the user can cause the predefined rules to be supplemented with network data based on current activities of the user, such as if the user is presently on a telephone call, presently logged into a particular email account (or two), presently logged into a particular instant messaging account, etc. The supplemented data available from the network may be stored in the user profile 130 and/or stored separately in the database 115 and the supplemented network available data changes based on current (and past) activities of the user.

In accordance with exemplary embodiments, the application 105 comprises a classification function that processes the predefined rules in the user profile 130 and applies supplemental data available from the network (e.g., the user being presently logged into a particular email account) to determine the classification identity for the incoming (or outgoing) email. From the determination made by the application 105 based on predefined rules 130 and any supplemented network available data, the application 105 determines a classification identity; the external helper server 10 transmits the classification result 134 having the classification identity to the application 110 of the gateway 20. The classification identity corresponds to particular services for the user in the service profile 124 of the post office server 120. The classification result 134 having the classification identity is sent by the application 105 to the gateway 20. The application 110 is operative to receive the classification result 134, retrieve the classification identity, place the classification identity in the email message (such as the email body, the email header, the email subject, etc.) of the email, and forward the email having the classification identity to the post office sever 120 of the server provider's internal network 21. When the post office server 120 receives the email having the classification identity from the gateway 20, the classification identity is configured to cause the post office server 120 to process the email from the source 12. Based on the classification identity received by the post office server 120, the post office server 120 is configured to process the email according to a corresponding service profile of the user in the service profile 124. That is, the classification identity can be utilized by the email application 122 to search the service profile database 124 for the service profile that corresponds to (e.g., matches) the classification identity determined by the external helper server 10. The corresponding service profile of the service profile 124 contains specific instructions on how the post office server 120 should process the email. The following example is provided by way of example and not limitation.

The user profile 130 of the external helper server 10 may have 3 different classification identities stored in the user profile 130 for a user Harry, and the classification identities may be Harry 1, Harry 2, and Harry 3. Any one or more of the classification identities may be sent in the result 134 by the application 105 to the gateway 20 so that the gateway 20 can forward the email with the one or more classification identities to the post office server 120. The service profile database 124 would likewise have 3 different corresponding service profiles corresponding to the 3 classification identities such as, e.g., a Harry 1 service profile, Harry 2 service profile, and Harry 3 service profile. The application 110 of the gateway 20 may automatically parse each field of the classification result 134 and recognize that characters in certain fields correspond to the classification identity for processing the email. The application 110 of the gateway 20 includes logic to understand how to obtain the classification identity and add the classification identity to the email to be sent to the post office server 120.

After the email application 122 searches the service profile 124 for the corresponding matching service profiles Harry 1 service profile, Harry 2 service profile, and Harry 3 service profile, each Harry 1 service profile, Harry 2 service profile, Harry 3 service profile contains specific instructions that can be recognized, read, and executed by the email application 122.

If for example the classification identity is Harry 1, and the corresponding service profile is the Harry 1 service profile, the Harry 1 service profile may be representative of Harry's instant messaging account with the service provider of the gateway 20, and accordingly, the email application 122 of the post office server 120 is operative to transmit the email to that instant messaging account in a format suitable for the instant messaging account on the service provider's internal network 21. Also, the Harry 1 service profile may include instructions for the email application 122 to transmit the email to multiple different instant messaging accounts including instant messaging accounts inside and outside of the internal network of the service provider 21. For instance, based on the Harry 1 service profile of the service profile database 124, the email application 122 of the post office server 120 is configured to route the email in a suitable format to an instant messaging account of the user Harry via the gateway 30 to the service provider's internal network 31. In this example, gateway 30 represents an outside service provider (such as, e.g., AOL®) that is different from the service provider (such as, e.g., AT&T®) of the gateway 20. Once the gateway 30 receives the instant message in a suitable format from the gateway 20, the gateway 30 passes the instant message to the post office sever 130 which routes the instant message (which is the email in a suitable format) to Harry's corresponding instant messaging account in the service provider's internal network 31. Additionally, and/or alternatively, the Harry 1 service profile may instruct the email application 122 of the post office server 120 to transmit an alert to all instant messaging accounts on file for Harry, which includes instant messaging accounts controlled and operated by the service provider of the gateway 20, instant messaging accounts controlled and operated by the service provider of the gateway 30, and other instant messaging accounts of other service providers (not shown for conciseness).

Now, if for example the classification identity is the Harry 2 classification identity from the external helper server 10, and if the corresponding service profile (matched in the service profile database 124 by the email application 122) is the Harry 2 service profile, the Harry 2 service profile may be representative of Harry's normal email account with the service provider's internal network 21 that utilizes gateway 20 in which the source 12 initially addressed the incoming email. The email application 122 is operative to transmit the email to the mailbox for the normal email account of Harry in the service provider's internal network 21 based on instructions of the Harry 2 service profile. Also, the Harry 2 service profile may include instructions and email addresses to other email accounts that the incoming email is to be transmitted by the email application 122 in addition to transmitting the email to the normal email account in the service provider's internal network 21. The other email accounts and their corresponding email addresses may be for outside service providers, which are different from the service provider of the gateway 20. For example, the gateway 30 may be for one outside service provider. The email application 122 of the post office server 120 (e.g., representing a first service provider such as HOTMAIL®) can transmit a copy of the email to the application 112 of the gateway 30 (representing a second service provider such as AOL®). The application 112 of the gateway 30 passes the email to its post office server 140, which is configured to process the email and transmit the email to the corresponding email account of Harry on the second service provider's internal network 31. Similarly, the post office server 120 can transmit a copy of the incoming email to other email gateways (not shown) for other service providers as instructed by the Harry 2 service profile in the service profile database 124.

Further regarding the Harry 2 service profile of the service profile database 124, the Harry 2 service profile may also specify specific folders to place the email in. Based on receiving the classification result 134 having the Harry 2 classification and based on the email application 122 finding the corresponding (matching) Harry 2 service profile in the service profile database 124, the email application 122 of the post office server 120 routes the incoming email to a particular folder within the normal email account such as a friend folder, family folder, work folder, bank statements folder, credit card statements folders, bills folder, etc., within the service provider's internal network 21.

With regard to the Harry 3 service profile of the service profile database 124, the Harry 3 service profile may be representative of one or more communication devices such as a cell phone, and the email application 122 may be instructed to send a text message such as a SMS of the incoming email (in a suitable format) to the communication device. Based on the classification results 134 having the Harry 3 classification identity and based on the email application 122 finding the corresponding (matching) Harry 3 service profile in the service profile database 124, the email application 122 of the post office server 120 is configured to transmit a text message of the email to a communication device that is part of the service provider's internal network 21. Also, the email application 120 of the post office server 120 may transmit a text message of the email to the gateway 30 of a different service provider, and the gateway 30 (via the post office server 140) routes the text message to a different communication device that is on its communication network, which in the service provider's internal network 31.

Making changes to the network address book in the user profile 130 (or any predefined rule) can centrally change the treatment of all communications for the user because all communications (including telephony, emails, text messaging, instant messaging, social networking) can receive a classification result 134 based on the predefined rules in the user profile 130. In the scenario above, the user may change the contact of the sender from a business contact to a friend contact in the user profile 130, and the application 105 is operative to determine that the Harry 1 classification identity, Harry 2 classification identity, and Harry 3 classification identity should all be included in the classification result 134 to the gateway 20, because this provides a wider prospect of reaching Harry. Another person may have predefined rules in her user profile 130 that are completely the opposite, and that person may prefer to be more accessible for business contacts than for friend contacts. Also, another person may have predefined rules that cause him to be more accessible for family contacts in his user profile 130 than for business contacts and/or friend contacts. It is understood that the predefined rules in the user profile 130 can be set according to the preferences and desires of the particular user.

As another example, the user of gateway 20 may send an outgoing email addressed to a destination 14, which is for Fred. Before the email is transmitted to the destination 14, which comprises hardware and software for receiving the email, the application 110 is operative to send a query 132 to the external helper server 10 to determine if there are any predefined rules for processing the outgoing email. The application 105 receives the query 132, accesses the user profile 130 to analyze the predefined rules for the user (based on, e.g., the recipient's email address), and determines the classification identity. Based on the predefined rules in the user profile 130, the application 105 returns the classification result 134 having the classification identity to the application 110 of the gateway 20. As discussed herein, the email application 122 of the post office server 120 receives the classification identity in the email from the gateway 20, finds the corresponding service profile in the service profile database 124, and processes the outgoing email based on the corresponding service profile (instructions). There can be numerous ways set by the user for processing the outgoing email that correspond to the classification identity sent in the classification result 134 by the external helper server 10.

In one scenario, after receiving the classification identity and finding the corresponding service profile, the corresponding service profile may instruct the email application 122 not to transmit the outgoing email to the destination 14 and may provide the email application 122 with a different email address for the recipient Fred to replace the email address for the destination 14. Accordingly, instead of transmitting the email to the original email address for the destination 14, the application 110 would transmit the email, e.g., to the gateway 30 which may be another email account for Fred. In this case, the user may have set in the predefine rules of the user profile 130 that after 5:00 pm but before 10:00 pm emails should be sent to Fred's personal email account because Fred is not going to be at work. As such, the application 105 reads the predefined rules and sends a classification identity in the result 134 that will correspond to a service profile in the service profile database 124 having instructions to send the email to the alternative email address for Fred. Accordingly, the email application 122 is configured to transmit the email to Fred's email account via the gateway 30 (on the service provider's internal network 31) and not the original email address at the destination 14.

In another scenario, after receiving the classification identity and finding the corresponding service profile, corresponding service profile may instruct the email application 122 to send the outgoing email to additional email accounts of Fred and/or send the outgoing email as a text message to Fred, along with sending the outgoing email to the email address for the destination 14. For example, the corresponding service profile of the servicer profile database 124 may instruct the email application 122 to send the email as a text message in a suitable format to the destination 14. Fred may have a text messaging account with the service provider of the gateway 30, and the corresponding service profile can instruct the email application 110 to transmit the email to Fred's device on the gateway 30 as a text message. Also, the corresponding service provider may instruct the email application 110 to send a copy of the email to Fred's email account on the gateway 30. Further, the outgoing email is transmitted to the address for the destination 14 as originally intended.

It is understood that many scenarios can be discussed which apply for both outgoing and incoming received by the gateway 20 and 30 according to the classification identity and the corresponding service profile.

Figure 2:
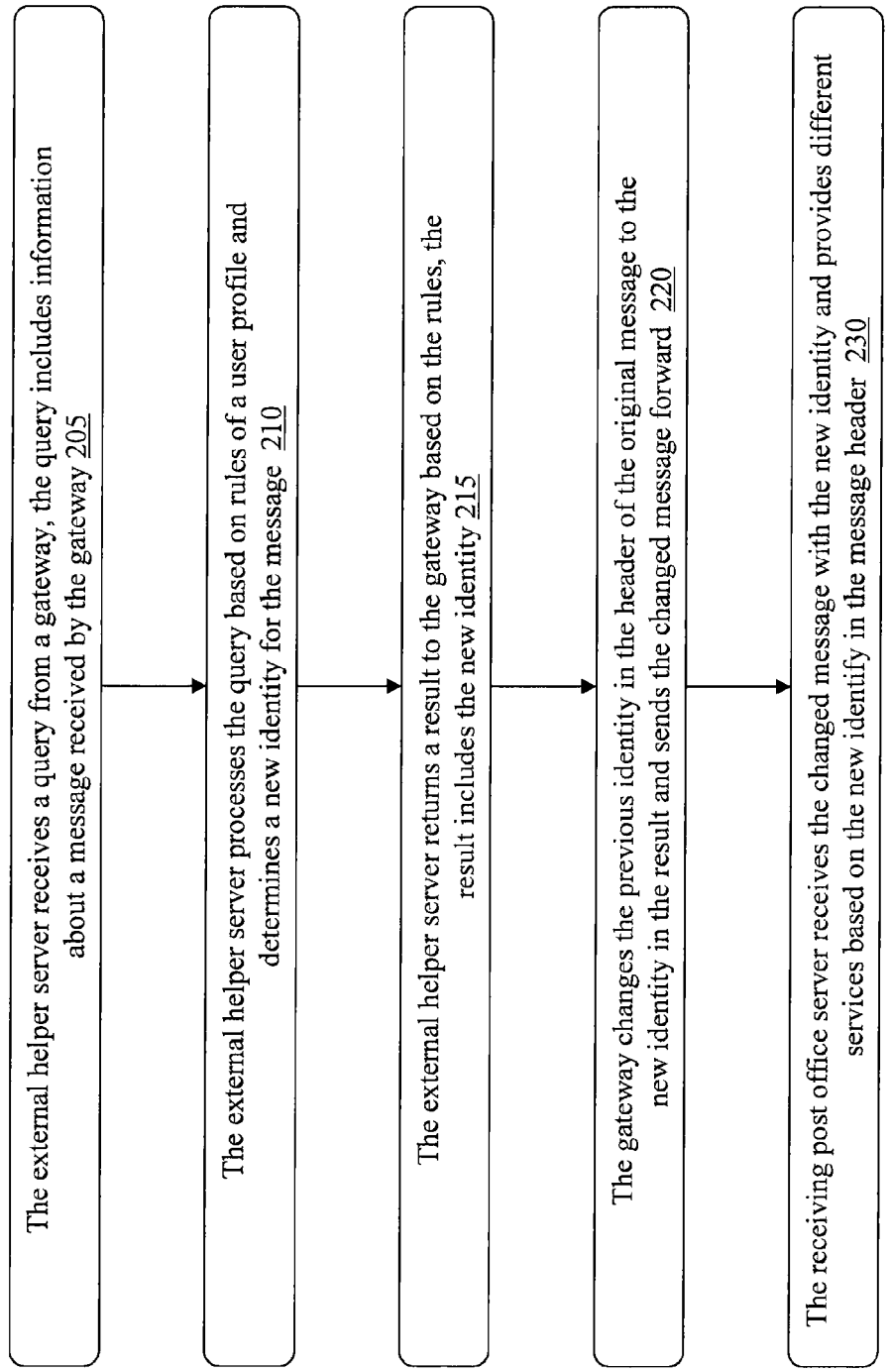
FIG. 2 illustrates an example of method for differentiated treatment of incoming and outgoing communications in accordance with exemplary embodiments.

FIG. 2 illustrates an example of a method 200 for differentiated treatment of incoming and outgoing emails based on the classification identify received from the external helper server 10 and the corresponding service profile in the service profile database 124 in accordance with exemplary embodiments.

The external helper server 10 is operative to receive a query 132 from the gateway 20 and the query 132 includes information about a message received by the gateway 20 at operation 205. The communication can be an incoming communication and/or an outgoing communication, and the external helper 10 is operative to provide classification identities for both. On behalf of the user, the application 110 is configured to transmit the query 132 to the application 105 of the external helper server 10.

The external helper server 10 is operative to obtain the predefined rules in the user profile 130 and determine a new identity (e.g., the classification identity) for the message at operation 210. For example, the application 105 may utilize the unique user identification code from the query 132 to identify and retrieve the user profile 130 for the user.

The external helper server 10 returns a result to the gateway based on the rules, and the result includes the new (classification) identity at operation 215.

The gateway 20 changes the previous identity in, e.g., the header of the original message to the new identity in the result and sends the changed message forward to the post office server 120 at operation 220.

The receiving post office server 120 receives the changed message with the new identity and provides different services based on the new identify in the message header at operation 230.

As discussed herein, the communication may be an incoming communication from an outside network such as the gateway 30 or the source 12, which is directed (e.g., addressed) to a user account within the internal network of the service provider 21 for the gateway 20. Also, the communication may be an outgoing communication from the user having an account and/or device on the internal network of the service provider 21 for the gateway 20; the user may be transmitting the outgoing communication to the gateway 30 and/or the destination 14, both of which may be a different service provider from the service provider of the gateway 20.

Further regarding the user profile 130, the user profile 130 is configured to include all of the predefined rules for differentiated treatment of communications to a user in one location, and the application 105 is operative to apply the predefined rules for any query 132 received at the external helper server 10.

The predefined rules of the user profile 130 may be configured with logical operators that may be utilized by the user to particularly define differentiated treatment of communications. The logical operators may include "and", "or", "if . . . then", "if and only if", "not both", "neither . . . nor", etc. For example, the user may have special rules during football season, e.g., on Monday night, during the playoffs, etc., that all text messages and email messages from certain senders and telephone numbers be addressed to his set top box at certain times. For example, Bob may send a text and/or email to Harry that includes certain key terms in the subject line such as the name of a football team, football, etc., to the gateway 20. The application gateway 20 sends the query 132 that includes the subject line, sender name and address, time, date, etc. When the application 105 is analyzing the query 132 in light of the predefined rules in the user profile 130, the application 105 determines that the date (preset by Harry on a calendar in the user profile) coincides with Monday night football, the sender Bob is in the predefined football category, and the subject line include a predefined key term (such as "score", "fumble", "football", etc.). Accordingly, the application 105 generates the result 134 having a classification identity that corresponds to the predefined rules. The result 134 sent by the application 105 includes a new classification identity via the gateway 20 to cause the post office sever 120 to transmit the text and/or email to the network address of a communication device (which is a set top box of Harry) during, immediately before, and/or immediately after the football game, so that the text and/or email messages (or an alert) appears on the television connected to the set top box.

There can be many other examples. For instance, Harry may have a sick relative, and Harry can make a change to his network address book of the user profile 130 to have each contact (e.g., other relatives) checked off as being part of a predefined "all" communication list. In the user profile 130, Harry can set the all communication list to have access to contact Harry and/or have communications transmitted to Harry in a suitable format on all communication devices and at all accounts of Harry. As such, when a query 132 is received about a communication from the gateway 20 and the query 132 includes the other relatives' names, email addresses, and/or subject line, the application 105 is operative to return the result 134 having a classification identity to the post office server 120 via the gateway 20, and the corresponding service profile (that matches the classification identity) that includes instructions to contact Harry at every known communication device and account.

As seen herein, the same sender (such as Bob) could be categorized differently by the application 105 at different times of the year, day, month, season, etc. Additionally, the application 105 is operative to categorize communications based on content, the type of contact (business contact, friend contact, acquaintance contact, family contact, emergency contact, all communication list, etc.). Further, supplemental data may be received by the external helper server 10 from, e.g., voice servers, voice mailboxes, base station controllers, service control points, etc., which indicate current activities of the user and past activities. The predefined rules of the user profile 130 may take into account this supplemental data in the determination of classification identities of the classification result 134. If, for example, the external helper server 10 receives supplemental data indicating that the user is currently on the communication device, which is a cell phone, the application 105 is operative to send a result 134 having an identity to correspond with a service profile indicating that a text message should be sent to the user's cell phone (on the service provider's internal network 31) in addition to the originally designated location which may be an email account (on the service provider's internal network 21). Also, in the determination of the application 105 for classification identities of the result 134, the predefined rules of the user profile 130 may be configured take into account previous emails, text messages, calls, etc. Many examples and scenarios are provided for explanation purposes and it is understood that they are not meant to be limiting.

Further regarding the networks 21, 30, and 31, the networks 21, 30, and 31 may include circuit-switched and/or packet-switched technologies and devices, such as routers, switches, hubs, gateways, etc., for facilitating communications. The networks 21, 30, and 31 may include wireline and/or wireless components utilizing, e.g., IEEE 802.11 standards for providing over-the-air transmissions of communications. The networks 21, 30, and 31 can include IP-based networks for communication between a customer service center and clients/users. The networks 21, 30, and 31 can manage multiple accounts as established by particular users. These accounts may then be used to provide access to services as described herein. Also, the networks 21, 30, and 31 may include wireline and/or wireless components utilizing standards, e.g., multimedia messaging services (MMS) and short message services (SMS). The networks 21, 30, and 31 may include a multimedia messaging service center (MMSC) and a short message service center (SMSC), which implement the network side of multimedia messaging service (MMS) and short messaging services (SMS) and make it possible for an operator to respectively offer multimedia messaging and short messaging to mobile communication device users. The networks 21, 30, and 31 can include a managed IP and/or wireless network administered by a service provider, which can control bandwidth and quality of service for the communications discussed herein. The networks 21, 30, and 31 may be implemented in a wireless fashion, e.g., using wireless protocols and technologies, such as Wi-Fi®, WiMAX™, Bluetooth®, etc. The networks 21, 30, and 31 can also be a packet-switched network, such as a local area network, a wide area network, a metropolitan area network, an Internet network, or other similar types of networks. The networks 21, 30, and 31 may be a cellular communications network, a fixed wireless network, a wireless local area network (LAN), a wireless wide area network (WAN), a personal area network (PAN), a virtual private network (VPN), an intranet or any other suitable network, and the networks 21, 30, and 31 may include equipment for receiving and transmitting signals, such as a cell tower, a mobile switching center, a base station, and a wireless access point.

Exemplary embodiments have been described in which the services of the external helper server 10 are external to (not controlled and operated by) the outside communication service providers of gateway 20, gateway 30, post office server 120, post office server 140, source 12, and destination 14, and the outside communication service providers can access the external helper server 10. However, in some exemplary embodiments, it is understood that the external helper server 10 could part of a particular service provider (e.g., AT&T®) and the other outside commercial service providers (such as T-MOBILE®, COX®, CHARTER®, HOTMAIL®, etc.), e.g., via the gateway 20 and/or the gateway 30 could contact the particular service provider for the services of the external helper server 10.

It is understood by one skilled in the art that each element described in the present disclosure contains all the necessary hardware, software, and/or firmware to operate and function as discussed herein in accordance with exemplary embodiments.

Figure 3:
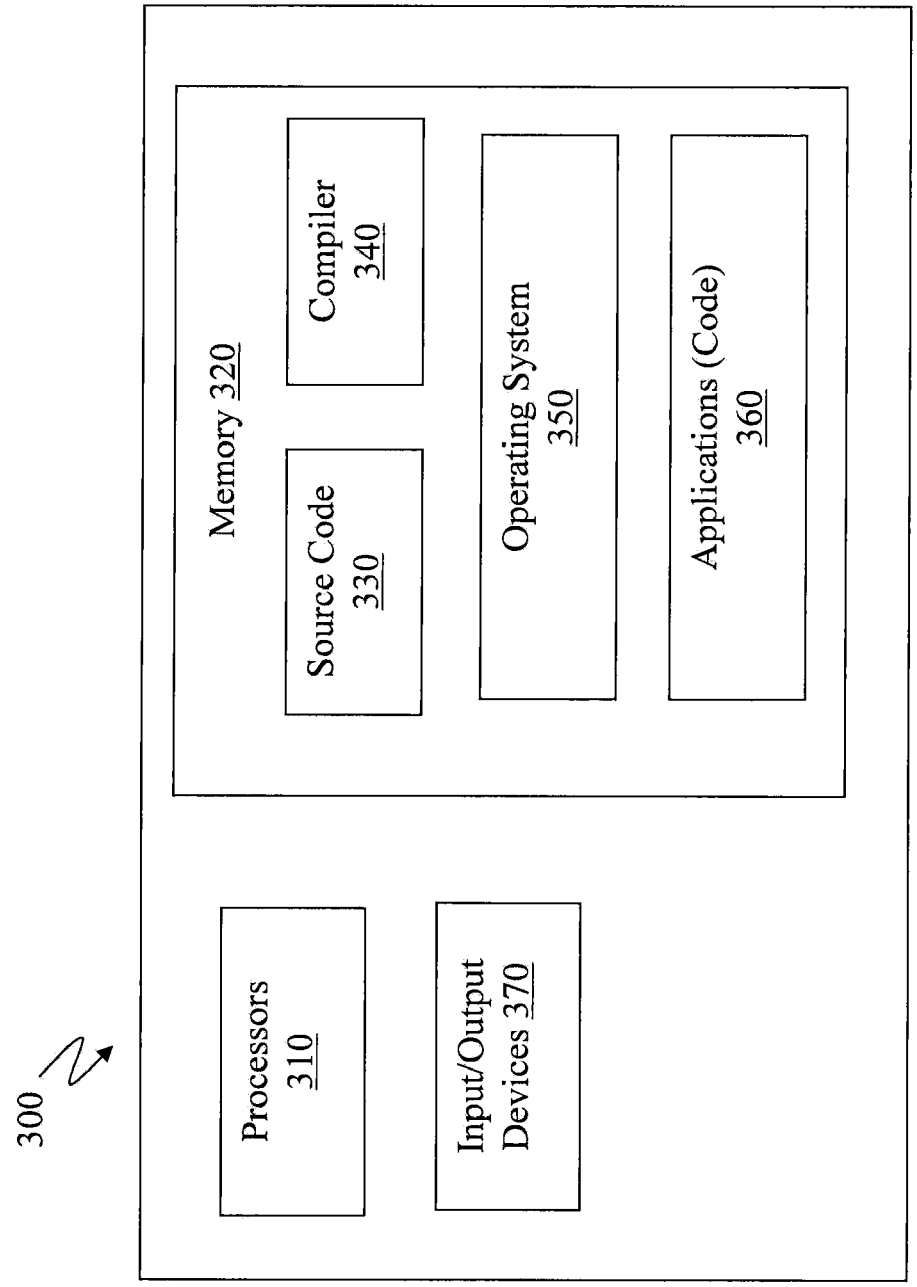
FIG. 3 illustrates a computer having elements utilized in exemplary embodiments.

FIG. 3 illustrates an example of a computer 300 that may be utilized in implementing exemplary embodiments. For example, the computer 300 may have one or more elements that may be utilized in implementing the server 10, the gateway 20, the gateway 30, the source 12, the destination 14, the service provider's internal network 21, the service provider's internal network 31, any devices or accounts discussed in herein, and any applications in accordance with exemplary embodiments. The computer 300 includes, but is not limited to, PCs, workstations, systems, laptops, PDAs, palm devices, servers, mobile devices, communication devices, cell phones, computer systems, set top boxes (STB), televisions (TV), game consoles, MP3 players, and the like. The computer 300 may include one or more processors 310, memory 320, and one or more input and/or output (I/O) 370 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in computer readable storage memory 320. The processor 310 can be virtually any custom made or commercially available processor, a central processing unit (CPU), a data signal processor (DSP), or an auxiliary processor among several processors associated with the computer 300, and the processor 310 may be a semiconductor based microprocessor (in the form of a microchip) or a macroprocessor.

The computer readable storage memory 320 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the computer readable storage memory 320 may incorporate electronic, magnetic, optical, and/or other types of storage media. Note that the computer readable storage memory 320 can have a distributed architecture, where various components are situated remote from one another, but can be accessed by the processor 310.

The software in the computer readable storage memory 320 may include one or more separate programs, each of which comprises an ordered listing of executable instructions for implementing logical functions. In the example illustrated in FIG. 3, the software in the computer readable storage memory 320 includes a suitable operating system (O/S) 350, compiler 340, source code 330, and one or more applications 360 (or modules) of the exemplary embodiments.

The operating system 350 controls the execution of other computer programs, and provides scheduling, input-output control, file and data management, memory management, and communication control and related services. It is contemplated by the inventors that the application 360 for implementing exemplary embodiments is applicable on all other commercially available operating systems.

The application 360 may be a source program, executable program (object code), script, or any other entity comprising a set of instructions to be performed. When a source program is to be executed, then the program is usually translated via a compiler (such as the compiler 340), assembler, interpreter, or the like, which may or may not be included within the computer readable storage memory 320, so as to operate properly in connection with the O/S 350. Furthermore, the application 360 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, remote controller, camera, biometric input device(s), a vibrator device for non-audible alert, etc. Furthermore, the I/O devices 370 may also include output devices, for example but not limited to, a printer, display, speaker, etc. Also, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 include may include modems, gateways, receivers, transmitters, transceivers, etc. for communicating over a communications network. The computer 300 may also include a subscriber identity module (SIM), e.g., on a removable SIM card which securely stores the service-subscriber key (IMSI) used to identify a subscriber on mobile telephony devices (such as computers and mobile phones).

When the computer 300 is in operation, the processor 310 is configured to execute software stored within the computer readable storage memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software, it should be noted that the application 360 can be stored on virtually any computer readable storage memory for use by or in connection with any computer related system or method. In the context of this document, a computer readable storage memory may be an electronic, magnetic, optical, or other physical device or means that can contain or store a computer program for use by or in connection with a computer related system or method.

The application 360 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, computer programs tangibly embodied on a computer-readable storage medium can be stored, communicated, propagated, or transported for use by or in connection with the instruction execution system, apparatus, or device.

More specific examples (a nonexhaustive list) of the computer-readable storage medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
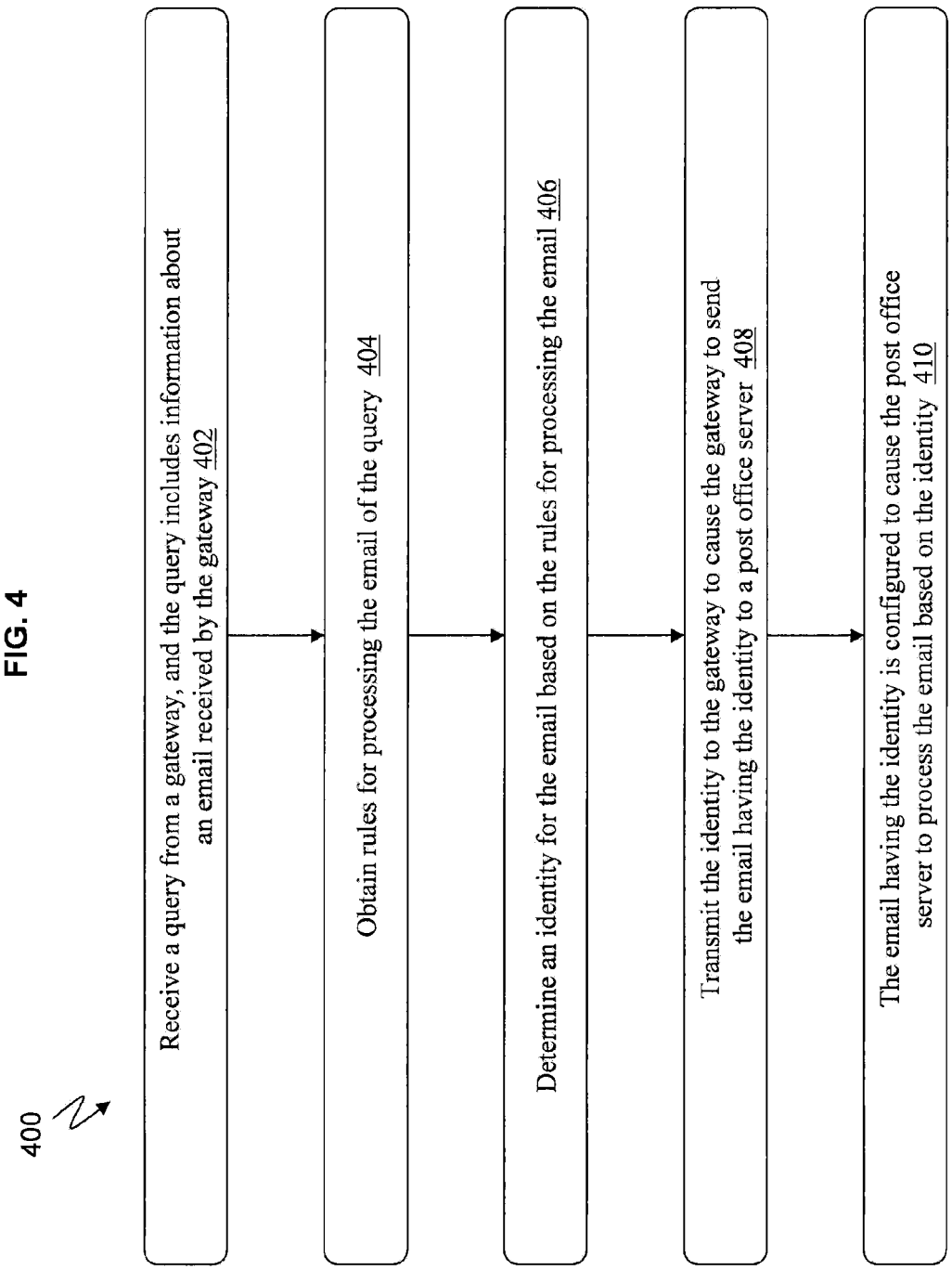
FIG. 4 illustrates an example of a method for differentiated treatment of incoming and outgoing emails based on a network server according to exemplary embodiments.

FIG. 4 illustrates a method 400 for differentiated treatment of incoming and outgoing emails based on a network server according to exemplary embodiments.

The external helper server 10 is configured to receive a query 123 from the gateway 20, and the query 132 includes information about an email received by the gateway 20 at operation 402.

The external helper server 10 is configured to obtain rules in the user profile for processing the email of the query 132 at operation 404.

The external helper server 10 is configured to determine an identity in the user profile 130 for the email based on the rules for processing the email at operation 406.

The external helper server 10 is configured to transmit the identity in the result 134 to the gateway 20 to cause the gateway 20 to send the email having the identity to the post office server 120 at operation 408.

The email having the identity is configured to cause the post office server 120 to process the email based on the identity at operation 410.

Additionally, in exemplary embodiments, the external helper server 10 to receive the query 132 before the gateway 20 sends the email to the post office server 120. The identity determined by the external helper server 10 is operative to cause the post office server 120 to transmit the email according to instructions in the service profile 124. The identity is operative to cause the post office server 120 to cancel an original destination (e.g., email address and/or mailbox) for the email received by the gateway 20. The identity is operative to cause the post office server 120 to transmit the email to one or more destinations (email addresses) different from an original destination (original email address) for the email. The identity is operative to cause the post office server 120 to transmit the email to one or more destinations in addition to an original destination for the email. The identity is operative to cause the post office server 120 to transmit a copy of the email to additional destinations (email addresses) along with an original destination, and the additional destinations comprise: text message accounts, different email accounts, set top boxes, and instant messaging accounts. Also, the result is operative to cause the gateway 20 to transmit the copy of the email to the additional destinations in a format suitable for each of the additional destinations.

The identity of the external email server 10 is operative to cause the post office server 120 to provide the email in one or more designated folders of a mailbox for an email address instead of placing the email in an inbox for the email address, and the inbox for the email address is an original destination for the email received by the gateway 120. When the post office server 120 is operated by a service provider (such as the service provider 21 and when the email is to be transmitted to a user account provisioned by the service provider 21 as the email's original destination, the identity is operative to cause the post office server 120 to transmit the email to additional user accounts respectively provisioned by other service providers, such as the service provider 31.

The external helper server 10 is operative to receive queries 132 from a plurality of different gateways (such as gateways 20 and 30 and other gateways) each operated by different service providers (such as service providers 21 and 31 and other service providers), in response to the plurality of different gateways respectively receiving emails that need processing; the external helper server 10 has at least one of: a same service provider as one of the different service providers, and/or a different service provider than any of the different service providers. In response to receiving a change to a user profile 130 of the external helper server 10, the external helper server 10 is operative to cause each of a plurality of different post office servers (such as the post office servers 120 and 130) to change how the plurality of different post office servers process emails for a user.

Further, in response to receiving the queries from the plurality of different gateways (such as the gateways 20 and 30), the external helper server 10 is operative to transmit a plurality of identities (in a plurality of results 134) to each of the plurality of different gateways (such as the gateways 20 and 30), respectively; the plurality of identities cause each of the plurality of different gateways to send the email having the identity to a plurality of post office servers to process the email based on the plurality of identities, respectively.

Also, the external helper server 10 is operative to determine the identity for the email based on the rules for processing the email which comprises determining the identity based on a sender's email address. The identity is included in the email in at least one of a message body and a header of the email by the gateway 20, the identity included in the email causes the post office server 120 to utilize the identity to search the service profile 124 to determine how to process the email, and the identity in the email causes the post office server 120 to process the email based on instructions corresponding to the identity stored in the service profile 124.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a computer readable storage medium, loaded into and/or executed by a computer. When the computer program code is loaded into an executed by a computer, the computer becomes an apparatus for practicing the exemplary embodiments. When implemented on a general-purpose microprocessor, the computer program code segments configure the microprocessor to create specific logic circuits. It is understood that computer program code can be transmitted over some transmission medium, loaded into and/or executed by a computer, or transmitted over some transmission medium, such as over electrical wiring or cabling, through fiber optics, or via electromagnetic radiation.

While features have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the present disclosure without departing from the essential scope thereof. Therefore, it is intended that the present disclosure not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for differentiated treatment of incoming and outgoing emails of a subscriber, comprising:
   receiving by a server a query from a gateway, the query including information about an email to the subscriber received by the gateway in which the email is to be transmitted to a post office server;
   obtaining by the server rules of the subscriber for processing the email of the query, the rules being predefined by the subscriber in advance to process the email;
   wherein the server is distinct from the post office server and distinct from the gateway;
   determining by the server a determined classification identity for the email based on the rules for processing the email for the subscriber, determining the determined classification identity comprising determining whether a first classification identity applies, determining whether a second classification identity applies, determining whether a third classification identity applies, and determining whether all classification identities apply;
   wherein the first classification identity causes the post office server to transmit the email to an instant messaging account for the subscriber, the second classification identity causes the post office server to transmit the email to an initially addressed email account and transmit copies of the email to other email accounts in addition to the initially addressed email account, and the third classification identity causes the post office server to transmit a text message to a cell phone;
   transmitting by the server the determined classification identity to the gateway to cause the gateway to send the email having the determined classification identity to the post office server;
   wherein the email having the determined classification identity is operative to cause the post office server to process the email based on the determined classification identity;
   based on the subscriber making the change to the a network address book of the subscriber concerning a sender, centrally changing treatment of all incoming communications for the subscriber related to the sender including telephony, emails, text messaging, and social networking; and
   based on the subscriber making the change to the network address book of the subscriber, causing all the classification identities to apply to the sender.

2. The method of claim 1, wherein the server receives the query before the gateway sends the email to the post office server;
   wherein the second classification identity causes the email to be routed to a particular folder which includes, a bank statements folder, a credit card statements folder, and a bills folder.

3. The method of claim 1, wherein the determined classification identity is
   operative to cause the post office server to transmit the email according to instructions in a service profile.

4. The method of claim 1, wherein the determined classification identity is
   operative to cause the post office server to cancel an original destination for the email received by the gateway.

5. The method of claim 1, wherein the determined classification identity is operative to cause the post office server to transmit the email to destinations different from an original destination for the email.

6. The method of claim 1, wherein the determined classification identity is
operative to cause the post office server to transmit the email to destinations in addition to an original destination for the email.

7. The method of claim 1, wherein the determined classification identity is
operative to cause the post office server to transmit a copy of the communication to additional destinations along with an original destination;
wherein the additional destinations comprise: text message accounts, different email accounts, set top boxes, and instant messaging accounts; and
wherein a result is operative to cause the gateway to transmit the copy of the communication to the additional destinations in a format suitable for each of the additional destinations.

8. The method of claim 1, wherein the determined classification identity is
operative to cause the post office server to provide the email in designated folders of a mailbox for an email address instead of placing the communication in an inbox for the email address; and
wherein the inbox for the email address is an original destination for the communication received by the gateway.

9. The method of claim 1, wherein when the post office server is
operated by a service provider and when the email is to be transmitted to a user account provisioned by the service provider as the original destination of the email, wherein the determined classification identity is operative to cause the post office server to transmit the email to additional user accounts respectively provisioned by other service providers.

10. The method of claim 1, wherein the server is operative to receive queries from a plurality of different gateways each operated by different service providers, in response to the plurality of different gateways respectively receiving emails that need processing; and
wherein the server has a service provider as one of the different service providers, and a different service provider than any of the different service providers.

11. The method of claim 1, wherein in response to receiving a change to a user profile of the server, the server is operative to cause each of a plurality of different post office servers to change how the plurality of different post office servers process emails for a user.

12. The method of claim 1, wherein the determining by the server the determined classification identity for the email based on the rules for processing the email comprises: determining the determined classification identity based on a sender email address.

13. The method of claim 1, wherein the determined classification identity is included in the email in a header of the email by the gateway;
wherein the determined classification identity included in the email causes the post office server to utilize the determined classification identity to search a service profile to find a matching service profile that determines how to process the email; and
wherein the determined classification identity in the email causes the post office server to process the email based on instructions of the matching service profile.

14. An apparatus for differentiated treatment of incoming and outgoing communications, the apparatus comprising:
memory comprising computer-executable instructions for differentiated treatment of incoming and outgoing communications, and a user profile comprising rules predefined by a subscriber and
a processor executing the computer-executable instructions, the computer-executable instructions, when executed by the processor, cause the processor to perform operations comprising:
receiving by a query from a gateway, the query including information about an email for a subscriber received by the gateway in which the email is to be transmitted to a post office server;
obtaining rules for processing the email of the query from the user profile, the rules being predefined by the subscriber in advance to process the email;
wherein the processor is distinct from the post office server and distinct from the gateway;
determining a determined classification identity for the email based on the rules for processing the email for the subscriber, determining the determined classification identity comprising determining whether a first classification identity applies, determining whether a second classification identity applies, determining whether a third classification identity applies, and determining whether all classification identities apply;
wherein the first classification identity causes the post office server to transmit the email to an instant messaging account for the subscriber, the second classification identity causes the post office server to transmit the email to an initially addressed email account and transmit copies of the email to other email accounts in addition to the initially addressed email account, and the third classification identity causes the post office server to transmit a text message to a cell phone;
transmitting the determined classification identity to the gateway to cause the gateway to send the email having the determined classification identity to the post office server;
wherein the email having the determined classification identity is operative to cause the post office server to process the email based on the determined classification identity;
based on the subscriber making the change to the a network address book of the subscriber concerning a sender, centrally changing treatment of all incoming communications for the subscriber related to the sender including telephony, emails, text messaging, and social networking; and
based on the subscriber making the change to the network address book of the subscriber, causing all the classification identities to apply to the sender.

15. The apparatus of claim 14, wherein the determining the determined classification identity for the email based on the rules for processing the email comprises: determining the determined classification identity based on a sender email address.

16. The apparatus of claim 14, wherein the determined classification identity is included in the email in a header of the email by the gateway;
wherein the determined classification identity included in the email causes the post office server to utilize the determined classification identity to search a service profile to determine how to process the email; and
wherein the determined classification identity in the email causes the post office server to process the email based on instructions, corresponding to the determined classification identity, stored in the service profile.

17. The apparatus of claim 14, wherein the query is received before the gateway sends the email to the post office server.

18. The apparatus of claim 14, wherein the determined classification identity is operative to cause the post office server to transmit the email according to instructions in a service profile.

19. A non-transitory computer readable storage medium for differentiated treatment of incoming and outgoing emails, the computer readable storage medium including instructions that, when executed by a computer, cause the computer to perform operations comprising:

receiving by a server a query from a gateway, the query including information about an email for a subscriber received by the gateway in which the email is to be transmitted to a post office server;

obtaining rules for processing the email of the query from the user profile, the rules being predefined by the subscriber in advance to process the email;

wherein the server is distinct from the post office server and distinct from the gateway;

determining a determined classification identity for the email based on the rules for processing the email, determining the determined classification identity comprising determining whether a first classification identity applies, determining whether a second classification identity applies, determining whether a third classification identity applies, and determining whether all classification identities apply;

wherein the first classification identity causes the post office server to transmit the email to an instant messaging account for the subscriber, the second classification identity causes the post office server to transmit the email to an initially addressed email account and transmit copies of the email to other email accounts in addition to the initially addressed email account, and the third classification identity causes the post office server to transmit a text message to a cell phone;

transmitting the determined classification identity to the gateway to cause the gateway to send the email having the determined classification identity to the post office server;

wherein the email having the determined classification identity is operative to cause the post office server to process the email based on the determined classification identity;

based on the subscriber making the change to the a network address book of the subscriber concerning a sender, centrally changing treatment of all incoming communications for the subscriber related to the sender including telephony, emails, text messaging, and social networking; and based on the subscriber making the change to the network address book of the subscriber, causing all the classification identities to apply to the sender.

* * * * *